United States Patent
Chang et al.

(10) Patent No.: US 6,352,599 B1
(45) Date of Patent: *Mar. 5, 2002

(54) HIGH PERFORMANCE IRON-RARE EARTH-BORON-REFRACTORY-COBALT NANOCOMPOSITE

(75) Inventors: Wen Cheng Chang, Chai-Yi (TW); Bao-Min Ma, Robbinsville; Qun Chen, Princeton, both of NJ (US); Charles O. Bounds, Barrington, RI (US)

(73) Assignee: Santoku Corporation, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/351,760

(22) Filed: Jul. 12, 1999

(Under 37 CFR 1.47)

Related U.S. Application Data (60) Provisional application No. 60/092,959, filed on Jul. 13, 1998.

(51) Int. Cl.[7] ............................................. H01F 1/057
(52) U.S. Cl. ....................... 148/302; 148/101; 148/121; 252/62.54
(58) Field of Search ................................ 148/302, 101, 148/121; 420/83, 121; 252/62.54

(56) References Cited

U.S. PATENT DOCUMENTS

| | | |
|---|---|---|
| 4,402,770 A | 9/1983 | Koon |
| 4,409,043 A | 10/1983 | Koon |
| 4,533,408 A | 8/1985 | Koon |
| 4,663,066 A | 5/1987 | Fruchart et al. |
| 4,664,724 A | 5/1987 | Mizoguchi et al. |

(List continued on next page.)

FOREIGN PATENT DOCUMENTS

| | | |
|---|---|---|
| EP | 0 242 187 | * 10/1987 |
| JP | 6124825 | 5/1994 |
| JP | 0657899 | 6/1995 |
| WO | 9215995 | 9/1992 |

OTHER PUBLICATIONS

A. Manaf, et al, "Enhance Magnetic Properties in Rapidly Solidified Nd–Fe–B Based Alloys", Journal of Magnetism and Magnetic Materials, 101, p. 360–362 (1991).

R. Coehoorn, et al, "Novel Permanent Magnetic Materials Made By Rapid Quenching", Journal De Physique, 49, Colloque C8, Supplement No. 12, Tome 49, p. 669–670 (Dec. 1988).

E.F. Kneller et al, "The Exchange–Spring Magnet: A New Material Principle for Permanent Magnets", IEEE Transactions on Magnetics, vol. 27, No. 4, p. 3588–3600 (Jul. 1991).

A. Manaf, et al, "Magnetic Properties and Microstructural Characterisation of Isotropic Nanocrystalline Fe–Nd–B Based Alloys", IEEE Transactions on Magnetics, vol. 29, No. 6, p. 2866–2868 (Nov. 1993)

(List continued on next page.)

Primary Examiner—John Sheehan
(74) Attorney, Agent, or Firm—Stevens, Davis, Miller & Mosher, LLP (57) ABSTRACT

Magnetic nanocomposite materials including iron, rare earth elements, boron, refractory metals and cobalt which have favorable magnetic properties and are suitable for making bonded magnets are disclosed. Compositions of the present invention can be of the formula: $(N_{1-y}La_y)_vFe_{100-v-w-x-z}Co_wM_zB_x$, where M is at least one refractory metal selected from Ti, Zr, Hf, V, Nb, Ta, Cr, Mo and W; v is from about 5 to about 15; w is greater than or equal to 5; x is from about 9 to about 30; y is from about 0.05 to about 0.5; and z is from about 0.1 to about 5. Preferably M is at least Cr. These materials have good magnetic properties and are suitable for use in preparing bonded magnets.

25 Claims, 6 Drawing Sheets

U.S. PATENT DOCUMENTS

| | | | |
|---|---|---|---|
| 4,734,131 A | | 3/1988 | Arai et al. |
| 4,747,874 A | | 5/1988 | Ghandehari |
| 4,765,848 A | * | 8/1988 | Mohri et al. ................ 148/302 |
| 4,770,702 A | | 9/1988 | Ishigaki et al. |
| 4,770,723 A | | 9/1988 | Sagawa et al. |
| 4,792,368 A | | 12/1988 | Sagawa et al. |
| 4,802,931 A | | 2/1989 | Croat |
| 4,836,868 A | * | 6/1989 | Yajima et al. ............... 148/302 |
| 4,851,058 A | | 7/1989 | Croat |
| 4,867,785 A | | 9/1989 | Keem et al. |
| 4,902,360 A | | 2/1990 | Ma et al. |
| 4,935,074 A | | 6/1990 | De Mooij et al. |
| 4,952,239 A | | 8/1990 | Tokunaga et al. |
| 4,975,129 A | | 12/1990 | Fujimura et al. |
| 4,975,130 A | | 12/1990 | Matsuura et al. |
| 4,981,532 A | | 1/1991 | Takeshita et al. |
| 4,983,232 A | | 1/1991 | Endoh et al. |
| 5,037,492 A | | 8/1991 | Brewer et al. |
| 5,041,171 A | | 8/1991 | Buschow et al. |
| 5,049,208 A | | 9/1991 | Yajima et al. |
| 5,071,493 A | | 12/1991 | Mizoguchi et al. |
| 5,096,512 A | | 3/1992 | Sagawa et al. |
| 5,114,502 A | | 5/1992 | Bogatin |
| 5,135,584 A | | 8/1992 | Fujiwara |
| 5,162,064 A | | 11/1992 | Kim et al. |
| 5,172,751 A | | 12/1992 | Croat |
| 5,174,362 A | | 12/1992 | Croat |
| 5,186,761 A | | 2/1993 | Kobayashi et al. |
| 5,194,098 A | | 3/1993 | Sagawa et al. |
| 5,213,631 A | | 5/1993 | Akioka et al. |
| RE34,322 E | | 7/1993 | Koon |
| 5,228,930 A | | 7/1993 | Nakayama et al. |
| 5,250,206 A | | 10/1993 | Nakayama et al. |
| 5,281,250 A | | 1/1994 | Hamamura et al. |
| RE34,838 E | * | 1/1995 | Mohri et al. ................ 148/302 |
| 5,403,408 A | | 4/1995 | Krause et al. |
| 5,411,608 A | | 5/1995 | Hazelton et al. |
| 5,449,417 A | | 9/1995 | Shimizu et al. |
| 5,460,662 A | | 10/1995 | Kobayashi et al. |
| 5,545,266 A | | 8/1996 | Hirosawa et al. |
| 5,549,766 A | | 8/1996 | Tsutai et al. |
| 5,567,891 A | | 10/1996 | Bogatin et al. |
| 5,591,276 A | | 1/1997 | Yoshizawa et al. |
| 5,591,535 A | | 1/1997 | Hisano et al. |
| 5,597,425 A | | 1/1997 | Akioka et al. |
| 5,626,690 A | | 5/1997 | Matsuki et al. |
| 5,634,987 A | | 6/1997 | Zhang et al. |
| 5,643,491 A | | 7/1997 | Honkura et al. |
| 5,645,651 A | | 7/1997 | Fujimura et al. |
| 5,647,886 A | | 7/1997 | Kitazawa et al. |
| 5,656,100 A | | 8/1997 | Yamamoto et al. |
| 5,674,327 A | | 10/1997 | Yamamoto et al. |
| 5,690,752 A | | 11/1997 | Yamamoto et al. |

OTHER PUBLICATIONS

A. Manaf, et al, "Microstructure Analysis of Nanocrystalline Fe–Nd–B Ribbons With Enhanced Hard Magnetic Properties", Journal of Magnetism and Magnetic Materials, 128, p. 307–312 (1993).

W. C. Chang, et al, "The Effects of Boron Content on the Microstructure and Exchange Coupling Effect of Nd9.5Fe85.5–xB5+x Melt Spun Ribbons", IEEE Transactions on Magnetics, vol. 32, p. 4425–4427 (1996).

J. Bauer, et al, "Nanocrystalline FeNdB Permanent Magnets With Enhanced Remenance", Journal of Applied Physics, vol. 80, pp. 1667–1673 (1996).

F. Vajda, et al, "Demagnetized–state Dependence of Henkel Plots. I. The Preisach Model", Journal of Applied Physics, vol. 75, (10), pp. 5689–5691 (May 15, 1994).

P. E. Kelly, et al, "Switching Mechanisms in Cobalt–Phosphorous Thin Films", IEEE Transactions on Magnetics, vol. 25, No. 5, pp. 3881–3883 (Sep. 1989).

B.M. Ma, et al, "Comparison of the Improvement of Thermal Stabilit of NdFeB Sintered Magnets: Instrinsic and/or Microstructural", Journal of Applied Physics, 75, (10), pp. 6628–6630 (May 15, 1994).

Translation of foreign Office Action issued Jan. 10, 2001 citing reference.

Mishra, "Microstructure–Property Relationships in Magnequench Magnets", *Mat. Res. Soc. Symp. Proc.*, 1987, pp. 83–92, vol. 96.

Animesh et al., "Kinetics of Crystallisation of Rapidly Quenched FeNdB Alloy and its Application in the Processing of Permanent Magnets", *Journal of Non–Crystalline Solids*, 1989, pp. 185–194, vol. 113 Elsevier Science Publishers B.V., North–Holland.

Fuerst et al., "Melt–Spun $Nd_2(Co_xFe_{1-x})_{14}B$ Systems: Optimization of the Hard Magnetic Properties", *J. Appl. Phys.*, Aug. 15, 1989, pp. 1782–1788, vol. 66, No. 4.

Coehoorn et al., "Preparation and Magnetic Properites of R–Fe–B Permanent Magnet Materials Containing $Fe_3B$ as the Main Phase", *Journal of Magnetism and Magnetic Materials*, 1990, pp. 228–230, vol. 83, North–Holland.

Manaf et al., "Effect of Grain Size and Microstructure on Magnetic Properties of Rapidly Solidified $Fe_{82.4}Nd_{13.1}B_{4.5}$ Alloy", *J. Appl. Phys.*, Nov. 15, 1991, pp. 6366–6368, vol. 70, No. 10.

Manaf et al., "New Nanocrystalline High–Remanance Nd–Fe–B Alloys By Rapid Solidification", *Journal of Magnetism and Magnetic Materials*, 1993, pp. 302–306, vol. 128, Elsevier Science Publishers B.V., North–Holland.

Manaf et al., High–Energy–Product Rapidly Solidified Fe–Nd–B Alloys With Additions of Nb and Si, *J. Appl. Phys.*, May 15, 1993, pp. 6473–6475, vol. 73, No. 10.

Kanekiyo et al., Microstructure and Magnetic Properties of High–Remenance $Nd_5Fe_{71.5}Co_5B_{18.5}M$ (M = Al, Si, Ga, Ag, Au) Rapidly Solidified and Crystallized Alloys for Resin–Bonded Magnets:, *IEEE Transactions on Magnetics*, Nov. 1993, pp. 2863–2865, vol. 29, No. 6.

Bauer et al., "Magnetic Properties and Microstructural Analysis of Rapidly Quenched FeNdBGaNb Permanent Magnets", *Journal of Magnetism and Magnetic Materials*, 1995, pp. 323–334, vol. 139, Elsevier Science B.V.

Reiger et al., "Micromagnetic Analysis Applied to Melt–Spun NdFeB Magnets with Small Additions of Ga and Mo", *Journal of Magnetism and Magnetic Materials*, 1995, pp. 193–201, vol. 151, Elsevier Science B.V.

Chang et al., "The Effects of La–Substitution on the Microstructure and Magnetic Properties of Nanocomposite NdFeB Melt Spun Ribbons", *Journal of Magnetism and Magnetic Materials*, 1997. pp. 65–70, vol. 167, Elsevier Science B.V.

* cited by examiner

HIGH PERFORMANCE IRON-RARE EARTH-BORON-REFRACTORY-COBALT NANOCOMPOSITE

This appln claims benefit of Prov. No. 60/092,959 filed Jul. 13, 1998.

FIELD OF THE INVENTION

The present invention relates to magnetic materials, and more particularly relates to magnetic nanocomposite materials including iron, rare earth elements, boron, refractory metals and cobalt which have favorable magnetic properties and are suitable for making bonded magnets.

BACKGROUND INFORMATION

Magnetic alloys containing neodymium, iron and boron have been widely studied for use in sintered and bonded magnets due to their favorable magnetic properties. The $Nd_2Fe_{14}B$ phase has been identified as a hard magnetic phase exhibiting particularly good magnetic properties.

U.S. Pat. Nos. 4,402,770, 4,409,043 and Re. U.S. Pat. No. 34,322 to Koon, which are incorporated herein by reference, disclose magnetic alloys comprising lanthanum and other rare earth elements, transition metals such as iron and cobalt, and boron within specified ranges. Although the disclosed alloys have been found to possess good magnetic properties, such alloys do not have optimal properties, and have not become commercially viable.

The present invention provides favorable magnetic properties and are suitable for commercial production of bonded magnets.

SUMMARY OF THE INVENTION

The present invention provides a nanocomposite magnetic material of controlled composition which exhibits improved magnetic properties and can be easily processed. An object of the present invention is to provide a nanocomposite magnetic material comprising Fe, rare earth elements (preferably La, Pr and Nd), B, refractory metals and Co within specified ranges.

Compositions of the present invention can be of the formula: $(Nd_{1-y}La_y)_vFe_{100-v-w-x-z}Co_wM_zB_x$, where M is at least one refractory metal selected from Ti, Zr, Hf, V, Nb, Ta, Cr, Mo and W; v is from about 5 to about 15; w is greater than or equal to 5; x is from about 9 to about 30; y is from about 0.05 to about 0.5; and z is from about 0.1 to about 5. Preferably, M is Cr.

A further object of the present invention is to provide a nanocomposite magnetic material including a hard magnetic phase, a soft magnetic phase, and, preferably a refractory metal boride precipitated phase. The hard magnetic phase is preferably $Nd_2Fe_{14}B$, while the soft magnetic phase preferably comprises $\alpha$-Fe, $Fe_3B$ or a combination thereof. Most preferably, the material comprises the $\alpha$-(Fe,Co) and $R_2$(Fe, Co)$_{14}$B phases.

The present invention provides a method of making a nanocomposite magnetic material. The method includes the steps of providing a molten composition comprising Fe, rare earth elements (preferably Nd and La), B, at least one refractory metal (preferably Cr), and Co, rapidly solidifying the composition to form a substantially amorphous material, and thermally treating the material.

DETAILED DESCRIPTION OF THE PREFERRED EMBODIMENTS

Because of their potential high remanence ($B_r$) and maximum energy product ($(BH)_{max}$), nanocomposites have been intensively studied for bonded magnets. In the NdFeB system, two types of nanocomposite magnets, namely, $\alpha$-Fe/$Nd_2Fe_{14}B$ [1] and $Fe_3B$/$Nd_2Fe_{14}B$ [2,3], have been developed. The $B_r$ of these nanocomposites can be strongly influenced by the chemical composition as well as the average grain size of individual phases, volume fraction and distribution of $\alpha$-Fe and $Nd_2Fe_{14}B$[1] or $Fe_3B$ and $Nd_2Fe_{14}B$ [2,3]. Moreover, the $B_r$ and $(BH)_{max}$ can be further improved by increasing the saturation magnetization of the soft magnetic phase ($\alpha$-Fe) and/or the hard magnetic phase (the 2:14:1 phase). Similarly, the intrinsic coercivity, $_iH_c$, and squareness are strongly affected by elemental substitutions and the microstructure [4,5,6]. Conventional NdFeB-type ternary nanocomposites usually exhibit a $_iH_c$ of less than 9 kOe, regardless of the method of fabrication or elemental substitution/addition. Although the exchange coupled $\alpha$-Fe/$Nd_2Fe_{14}B$-type nanocomposites of $Nd_8Fe_{87}B_5$ and $Nd_8Fe_{87.5}B_{4.5}$ have been reported to exhibit extremely high $B_r$ (12.5 kG) and $(BH)_{max}$ (23.3 MGOe) [7], the low $_iH_c$ (5.3 kOe) may still limit their applications in certain areas; such as micro motors.

Compositions of the present invention can be of the formula: $(RE_{1-y}La_y)_vFe_{100-v-w-x-z}Co_wM_zB_x$, where RE is at least one rare earth element excluding La; M is at least one refractory metal selected from Ti, Zr, Hf, V, Nb, Ta, Cr, Mo and W; v is from about 5 to about 15; w is greater than or equal to 5; x is from about 9 to about 30; y is from about 0.05 to about 0.5; and z is from about 0.1 to about 5.

Preferably, y is from about 0.05 to about 0.1, more preferably y is from about 0.05 to about 0.07.

Suitable rare earth elements include La, Ce, Pr, Nd, Pm, Sm, Eu, Gd, Tb, Dy, Ho, Er, Tm, Yb and Lu. The total rare earth content of the present compositions is referred to herein as "TRE". The term "RE" as used herein means all of the suitable rare earth elements except La. Preferred RE elements are Nd, Pr, Dy, Tb and mixtures thereof, with Nd, Pr and mixtures thereof being most preferred. Suitable refractory metals include elements of Groups IVb, Vb, and VIb of the Periodic Table, e.g., Ti, Zr, Hf, V, NB, Ta, Cr, Mo and W. The refractory metal content of the present compositions is referred to herein as "M". Preferably, M is at least one refractory metal selected from Ti, V, Nb, Cr and Mo. More preferably M is at least one refractory metal selected from Ti, Nb and Cr. Most preferably M is Cr or Ti or a combination thereof. The benefits of Cobalt addition to the present nanocomposite material generally begins at about 1% to about 40%. Although the particularly preferred compositions of the present invention comprise equal to or greater than about 5% Co. Typical, preferred and more preferred ranges of TRE, B, M and Co are set forth in the following table:

|  | approximate ranges for: | | | | |
| --- | --- | --- | --- | --- | --- |
|  | TRE from about to about | B from about to about | M from about to about | Co from about to about | Fe from about to about |
| typical | 5–15 | 9–30 | 0.1–5 | 5–40 | balance |
| preferred | 9–12 | 9–12 | 0.5–4 | 5–20 | balance |
| more preferred | 9.5–11.5 | 10–12 | 0.5–3 | 6–15 | balance |
| most preferred | 9.5–11.5 | 10.5–11.5 | 1–2.5 | 7–12 | balance |

The magnetic materials of the present invention are preferably produced by a rapid solidification and thermal treatment process. Rapid solidification is achieved by quickly cooling the composition from the molten state by techniques such as melt spinning, jet casting, melt extraction, atomization and splat cooling. Cooling rates of from about $10^4$ to about $10^7$ C. per second are typically employed, preferably from about $10^5$ to about $10^{6°}$ C. per second. The rapidly solidified material is preferably substantially amorphous. After rapid solidification the material may be ground, may be ground and heat treated or may be directly heat treated.

The compositions of the present invention have been found to possess improved processability, allowing slower rapid solidification rates to be used. For example, during the melt spinning process, slower rotational wheel speeds may be used and/or larger volumes of material may be processed. The ability to use slower melt spinning wheel speeds is important because the molten alloy puddle that is in contact with the spinning wheel is substantially more stable when the wheel speed is reduced. Furthermore, the ability to process larger volumes of material allows for reductions in production costs.

After the composition has been rapidly solidified to the substantially amorphous state, it is preferably thermally treated to induce spontaneous crystallization. As used herein, the term "spontaneous crystallization" means the rapid and substantially homogenous formation of fine crystal grains. Spontaneous crystallization is preferably achieved by heating the material to a specified temperature for a controlled period of time, which results in nucleation of crystal grains without substantial subsequent grain growth. Temperatures of from about 400 to about 800° C. are suitable, preferably from about 600 to about 750° C., more preferably from about 645 to about 700° C. and most preferably from about 645 to about 655° C. Heating times of from about 0.001 second to about 2 hours are preferred, more preferably from about 0.01 second to about 15 minutes and most preferred from about 8 to about 11 minutes. The material may be heated in any suitable apparatus such as a furnace. Continuous and/or batch heating methods may be employed.

Preferably, the material is heated to its crystallization temperature and the heat source is removed before substantial grain growth occurs.

Powdered forms of the nanocomposite magnetic materials of the present invention are suitable for use in forming bonded magnets having good magnetic properties. Any conventional method for preparing the bonded magnet can be utilized. Preferably, the powdered nanocomposited magnetic materials are mixed with a binder and cured. The binder preferably comprises from about 0.5 to about 4 weight percent of the bonded magnet.

It has been discovered that the addition of the nanocomposite provides for materials where the (magnitude of) irreversible loss of induction is less than about −4%, preferably less than about −3.5%, when heated to about 180° C. and held for about 15 minutes.

Experimental

The following examples illustrate various aspects of the present invention and are not intended to limit the scope thereof.

TABLE I

The $B_r$, $_iH_c$, and $(BH)_{max}$ of the $(Nd_{0.95}La_{0.05})_{9.5}Fe_{78}Cr_2B_{10.5}$ ribbons in the as-spun and after 650, 675 and 700° C. - 10 min. thermal treatment.

| Ribbon Condition | $B_r$ (kG) | $_iH_c$ (kOe) | $(BH)_{max}$ (MGOe) |
| --- | --- | --- | --- |
| as-spun (25 m/sec) | 7.6 | 9.9 | 8.5 |
| 650° C. - 10 min. | 8.4 | 10.3 | 14.0 |
| 675° C. - 10 min. | 8.2 | 9.8 | 12.5 |
| 700° C. - 10 min. | 8.2 | 9.5 | 12.8 |

TABLE II

Comparison of $B_r$, $_iH_c$ and $(BH)_{max}$ of the $(Nd_{0.95}La_{0.05})_{9.5}Fe_{78-x}Co_xCr_2B_{10.5}$ (x = 0–10) ribbons after optimum treatment.

| Co Content x = | $B_r$ (kG) | $_iH_c$ (kOe) | $(BH)_{max}$ (MGOe) |
| --- | --- | --- | --- |
| 0 | 8.4 | 10.3 | 14.0 |
| 2.5 | 8.4 | 10.2 | 14.1 |
| 5.0 | 8.5 | 10.2 | 14.1 |
| 7.5 | 9.1 | 10.3 | 15.8 |
| 10 | 10.4 | 9.5 | 19.8 |

TABLE III

Comparison of the $_iH_c$, irreversible loss of induction and reversible temperature coefficient of induction (conventionally known as α) of the $(Nd_{0.95}La_{0.05})_{9.5}Fe_{78-x}Co_xCr_2B_{10.5}$ (x = 0–10) ribbons after optimum treatment.

| Co Content x = | $_iH_c$ (kOe) | Irrv. Loss of Induction (%) | α %/(° C.) |
| --- | --- | --- | --- |
| 0 | 10.3 | −3.5 | −0.184 |
| 2.5 | 10.2 | −2.7 | −0.144 |
| 5.0 | 10.2 | −3.0 | −0.131 |
| 7.5 | 10.3 | −3.2 | −0.118 |
| 10.0 | 9.5 | −3.4 | −0.105 |
| Control (commercial) | 9.2 | −4.5 | −0.105 |

Alloy ingots with compositions of $(Nd_{0.95}La_{0.05})_{9.5}Fe_{78-x}Co_xCr_2B_{10.5}$ (x=0–10) are prepared by vacuum induction melting. Ingots pieces of approximately 3 grams are crushed into small pieces to accommodate the size of the crucible for melt spinning. A quartz nozzle with an orifice of about 0.7–0.8 mm in diameter is used for melt spinning. Ribbons are produced with wheel speeds (Vs) ranging from about 15 to about 25 m/s. X-ray powder diffraction with Cu-Kα radiation is utilized to determine the degree of crystallinity in ribbons. The magnetic phases and the corresponding Curie temperatures ($T_c$) are determined by a Thermal Gravimetric Analyzer (TGA) in conjunction with an externally applied magnet field of 50 Oe, conventionally known as Thermo Magnetic Analysis (TMA). Selected partially amorphous ribbons are thermally treated at from about 650 to about 700° C. for about 10 minutes to cause crystallization and to improve the magnetic properties. The as-quenched and the thermally treated ribbons are magnetized with a pulse field of about 50 kOe, and the magnetic properties of the ribbons are measured by a Vibrating Saple Magnetometer (VSM) with an applied magnetic field of 12 kOe. The open circuit properties, namely, the irreversible loss of induction are determined by placing a fully magnetized ribbon with a size of about 4 mm×2.5 mm×50 mm in the VSM under zero applied magnetic field, cycled from about 2 to about 180° C. Wohlfarth's remanence analysis [8,9] is employed to determine the impact of partial Co-substitution for Fe on the strength of exchange-coupled interactions of the materials obtained.

Figure 1:
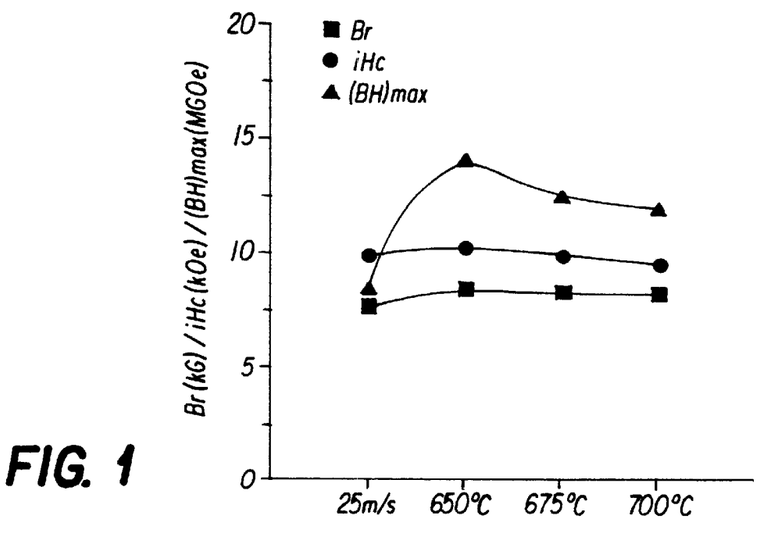
FIG. 1: The magnetic performance of the $(Nd_{0.95}La_{0.05})_{9.5}Fe_{78}Cr_2B_{10.5}$ ribbons in the as-spun state (Vs=25 m/s) and after optimum heat treatment.
Figure 2:
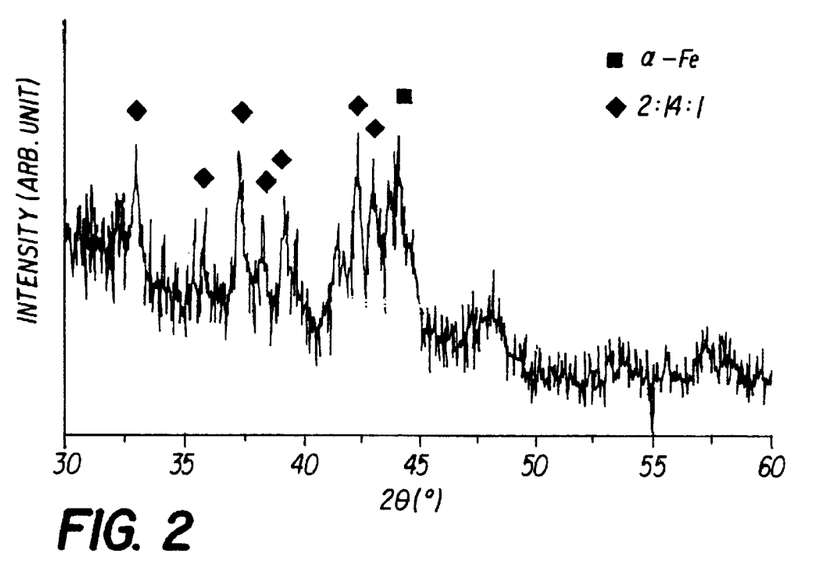
FIG. 2: X-ray diffraction pattern of $(Nd_{0.95}La_{0.05})_{9.5}Fe_{78}Cr_2B_{10.5}$ ribbon melt quenched at Vs=25 m/s.

Shown in FIG. 1 are the $B_r$, $_iH_c$ and $(BH)_{max}$ of the $(Nd_{0.95}La_{0.05})_{9.5}Fe_{78}Cr_2B_{10.5}$ ribbons in the as-melt spun state ($V_s$=25 m/s) and after an isothermal treatment at about 650, 675 and 700° C. for about 10 minutes, respectively. For convenience, the $B_r$, $_iH_c$ and $(BH)_{max}$ of these samples are listed in Table I for reference. The $B_r$, $_iH_c$ and $(BH)_{max}$ of the as-spun ribbons, without any thermal treatment, are relatively low: 7.6 kG, 9.9 kOe and 8.5 MGOe, respectively, and can be ascribed to the incomplete crystallization of ribbons, as evidenced by the superposition of broad peaks of amorphous precursor alloy and the characteristics of 2:14:1 and α-Fe peaks shown in FIG. 2. After an appropriate annealing, both $B_r$ and $(BH)_{max}$ are improved significantly. A $B_r$ of 8.4 kG, $_iH_c$ of 10.3 kOe and $(BH)_{max}$ of 14 MGOe are obtained after a 650° C.-10 min. thermal treatment. When treated at higher temperatures, namely about 675 or about 700° C., drastic decreases in $B_r$ and $(BH)_{max}$ can be observed indicating subtle grain growth or phase transformations may have occurred. Unlike $B_r$ or $(BH)_{max}$, the $_iH_c$ remains relatively constant at 9.5 to 9.9 kOe after any of the thermal treatments. All values suggest that about 650° C. for about 10 minute treatment can be the preferred thermal treatment for the materials of the present invention.

Figure 3:
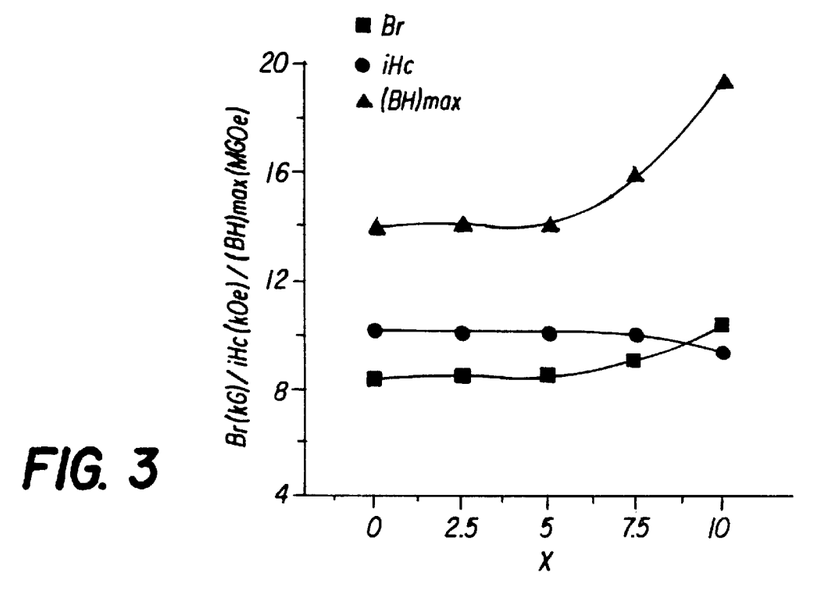
FIG. 3: The magnetic properties of the $(Nd_{0.95}La_{0.05})_{9.5}Fe_{78-x}Co_xCr_2B_{10.5}$ (x=0.10) ribbons after optimum heat treatment.
Figure 4:
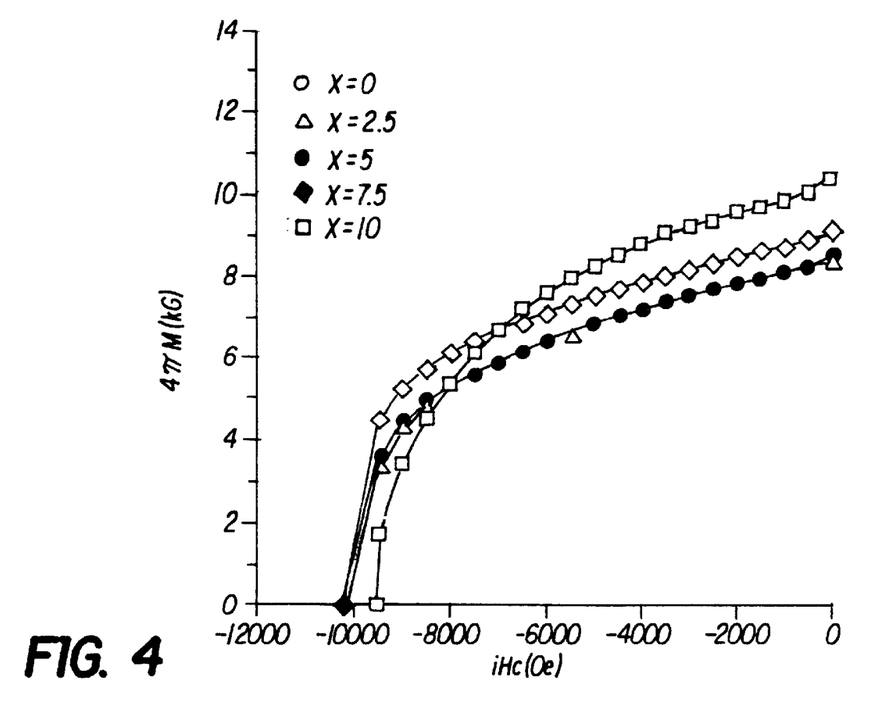
FIG. 4: The demagnetization curves of the $(Nd_{0.95}La_{0.05})_{9.5}Fe_{78-x}Co_xCr_2B_{10.5}$ (x=0–10) ribbons after optimum treatment.

Shown in FIG. 3 are the variation of optimum $B_r$, $_iH_c$ and $(BH)_{max}$ for the thermal treatments, with the Co content in $(Nd_{0.95}La_{0.05})_{9.5}Fe_{78.5-x}Co_xCr_2B_{10.5}$ alloy series. Initially, both $B_r$ and $(BH)_{max}$ remain almost constant at low Co concentration, i.e., x=2.5 and 5, then increase when x is increased above 7.5. A $B_r$ and $(BH)_{max}$ of more than 9.1 kG and 15.8 MGOe are obtained on samples with x of 7.5 and 10. Such high $B_r$ values suggest the existence of substantial exchange coupling interaction between the magnetically hard and soft phases. Substituting Co for Fe does not appear to impact the $_iH_c$ substantially. The $_iH_c$ ranges from 9.5 to 10.3 kOe within the compositions of the experiments. A $B_r$ of 10.4 kG, $_iH_c$ r of 9.5 kOe and $(BH)_{max}$ of 19.8 MGOe are achieved in ribbons with x=10. The high $_iH_c$ is contrary to the expectation that Co substitution for Fe may weaken the anisotropy constant of the hard magnetic phase and subsequently lead to a decrease in the $_iH_c$. obtained on nanocomposites. Microstructural changes of high Co-content alloy may play a critical role in explaining the high $_iH_c$ values preserved. It is theorized that the Co addition, with the presence of Cr, may change the liquid characteristics of precursor alloy for melt spinning, modify the microstructure of nanocomposites. For convenience, the $B_r$, $_iH_c$ and $(BH)_{max}$ of this alloy series are listed in Table II for comparison. Shown in FIG. 4 are the second quadrant demagnetization curves of $(Nd_{0.95}La_{0.05})_{9.5}Fe_{78-x}Co_xCr_2B_{10.5}$ (x=0–10) ribbons. The $_iH_c$ and squareness of the demagnetization curves appear insensitive to the amount of Co-substitution. One may theorize that the variation of $(BH)_{max}$ with Co content follows the same trend as $B_r$.

Figure 5:
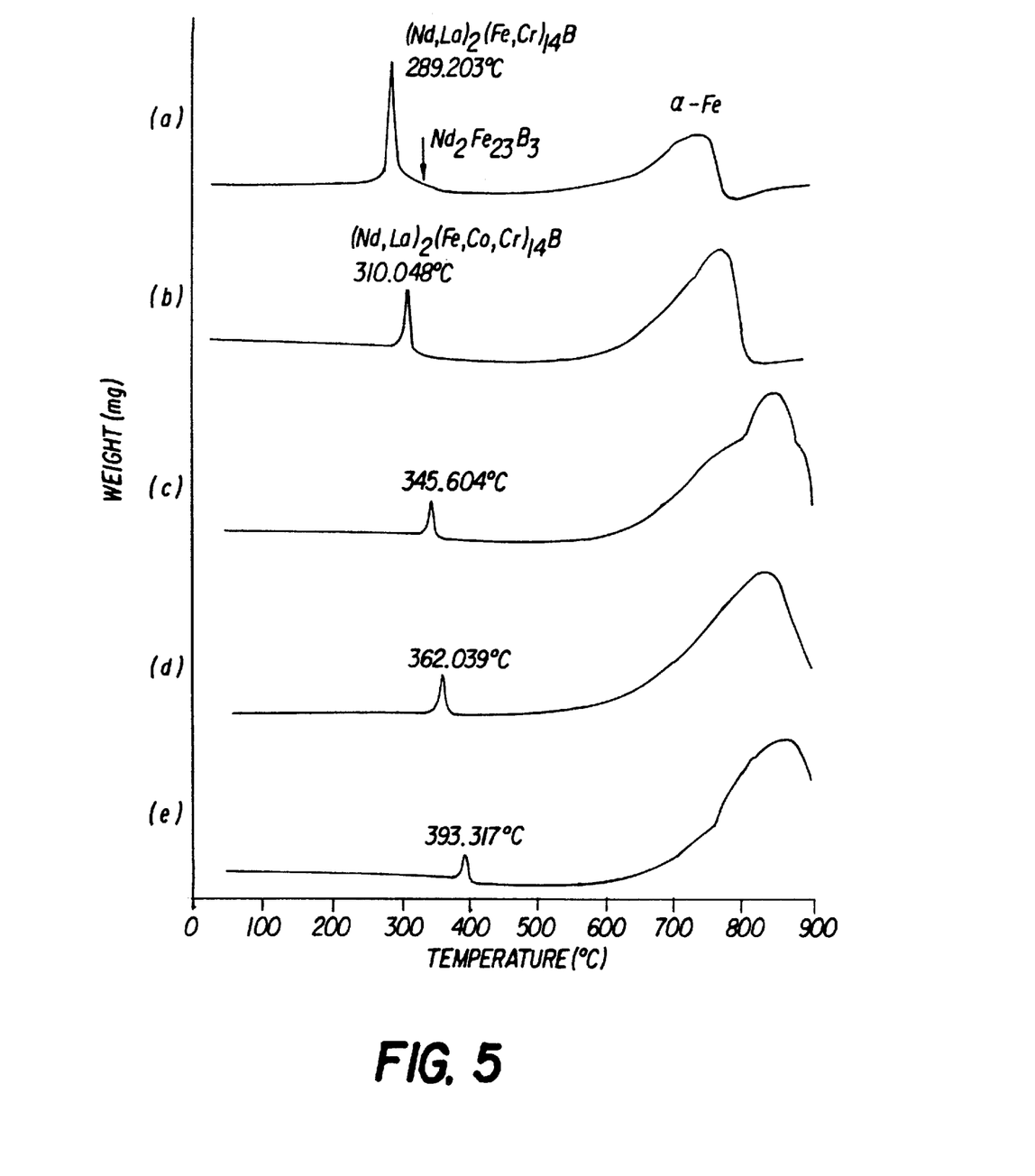
FIG. 5: TMA scans of the thermally treated $(Nd_{0.95}La_{0.05})_{9.5}Fe_{78-x}Co_xCr_2B_{10.5}$ (x=0–10) (a) x=0 (b) x=2.5 (c)x=5 (d) x=7.5 and (e) x=10 showing the existence of two magnetic phases, i. e. 2:14:1 and $\alpha$-Fe, and the increase of Tc in both phases.

In order to understand the mechanism causing the changes of $B_r$ and $(BH)_{max}$ with the amount of Co-substitution, the magnetic phase transformation are examined as a result of the Co-content for temperature ranges of from about 25 to about 900° C. Shown in FIGS. 5(a), (b), (c), (d) and (e) are the TMA scans of the optimally treated $(Nd_{0.95}La_{0.05})_{9.5}Fe_{78-x}Co_xCr_2B_{10.5}$ ribbons, where x=0,2.5, 5.0, 7.5 and 10, respectively. Only two magnetic phases, namely, $R_2Fe_{14}B$ and α-Fe, are found in the control sample (x=0). The $T_c$ of 2:14:1 phase is found to increase from about 289 to about 393° C. when the Co content is increased from x=0 to 10. This suggests that Co may, presumably, enter the crystal structure of the $Nd_2(Fe,Co)_{14}B$ phase. The $T_c$ of α-Fe is also found to increase from about 712 to about 860° C. when the x is increased from 0 to 10. Again, this change in $T_c$ also implies that Co may also form a solid solution of α-(Fe,Co).

Figure 6:
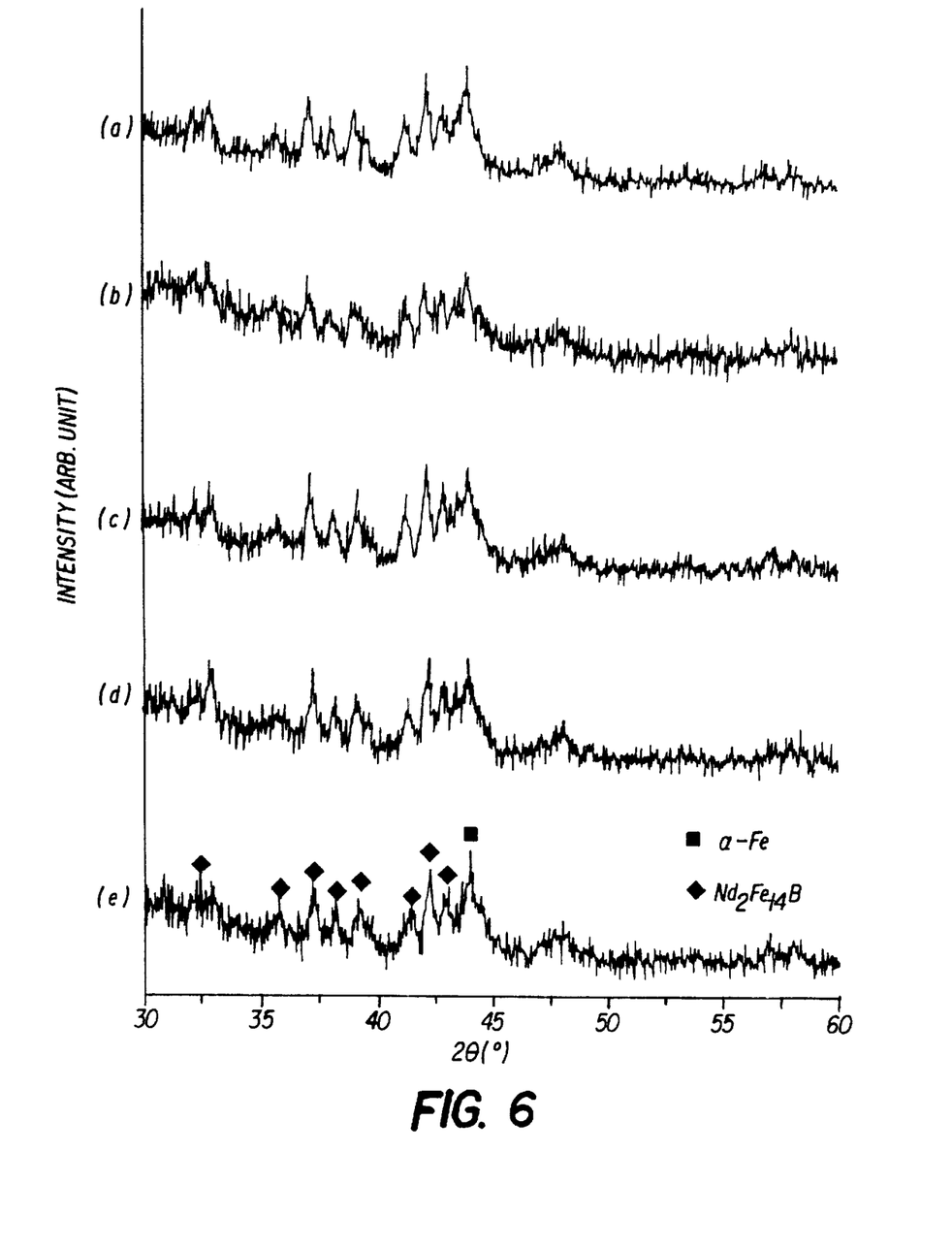
FIG. 6: X-ray diffraction patterns of the $(Nd_{0.95}La_{0.05})_{9.5}Fe_{78-x}Co_xCr_2B_{10.5}$ ribbons after optimum heat treatment, where (a) x=0, (b) x=2.5, (c)x=5, (d) x=7.5, and (e) x=10.
Figure 7:
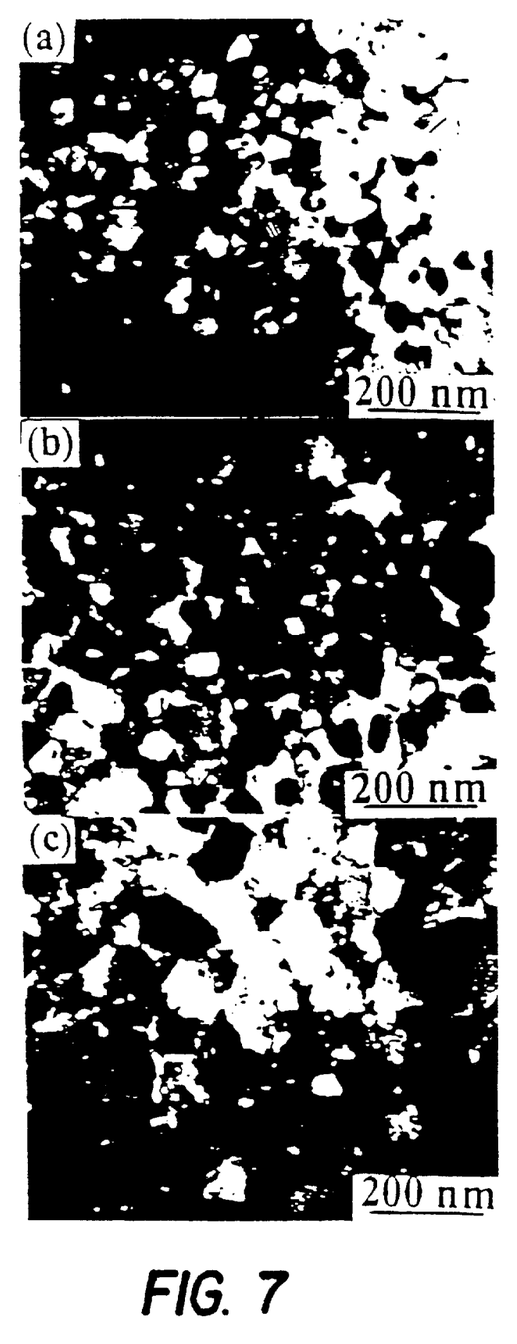
FIG. 7: TEM microstructures of $(Nd_{0.95}La_{0.05})_{9.5}Fe_{78-x}Co_xCr_2B_{10.5}$ ribbons with optimum magnetic properties, where (a) x=0, (b) x=5, and (c) x=10.

The average grain size of optimally treated ribbons are also compared by x-ray diffraction (XRD) and transmission electron microscopy (TEM). Shown in FIGS. 6(a), (b), (c), (d) and (e) are the XRD patterns of the experimental ribbons. Similar peak width of all samples studied indicate that the average grain size of these samples are approximately the same for both α-(Fe,Co) and 2:14:1 phases. Shown in FIGS. 7(a), (b) and (c) are TEM analysis of $(Nd_{0.95}La_{0.05})_{9.5}Fe_{78-x}Co_xCr_2B_{10.5}$ with x=0,5 and 10, respectively. Somewhat more grain growth occurred in the 5% Co-containing alloy (see FIGS. 7(a) and (b)). The difference in the average grain size becomes less pronounced when the x is increased from 5 to 10 as shown in FIGS. 7(b) and (c). It appears, however, that the grain boundary becomes less defined and even surrounded by a smudged secondary phase (not identified) when x is increased to 10. This change in microstructure may explain why the $_iH_c$ is insensitive to the Co-content.

Figure 8:
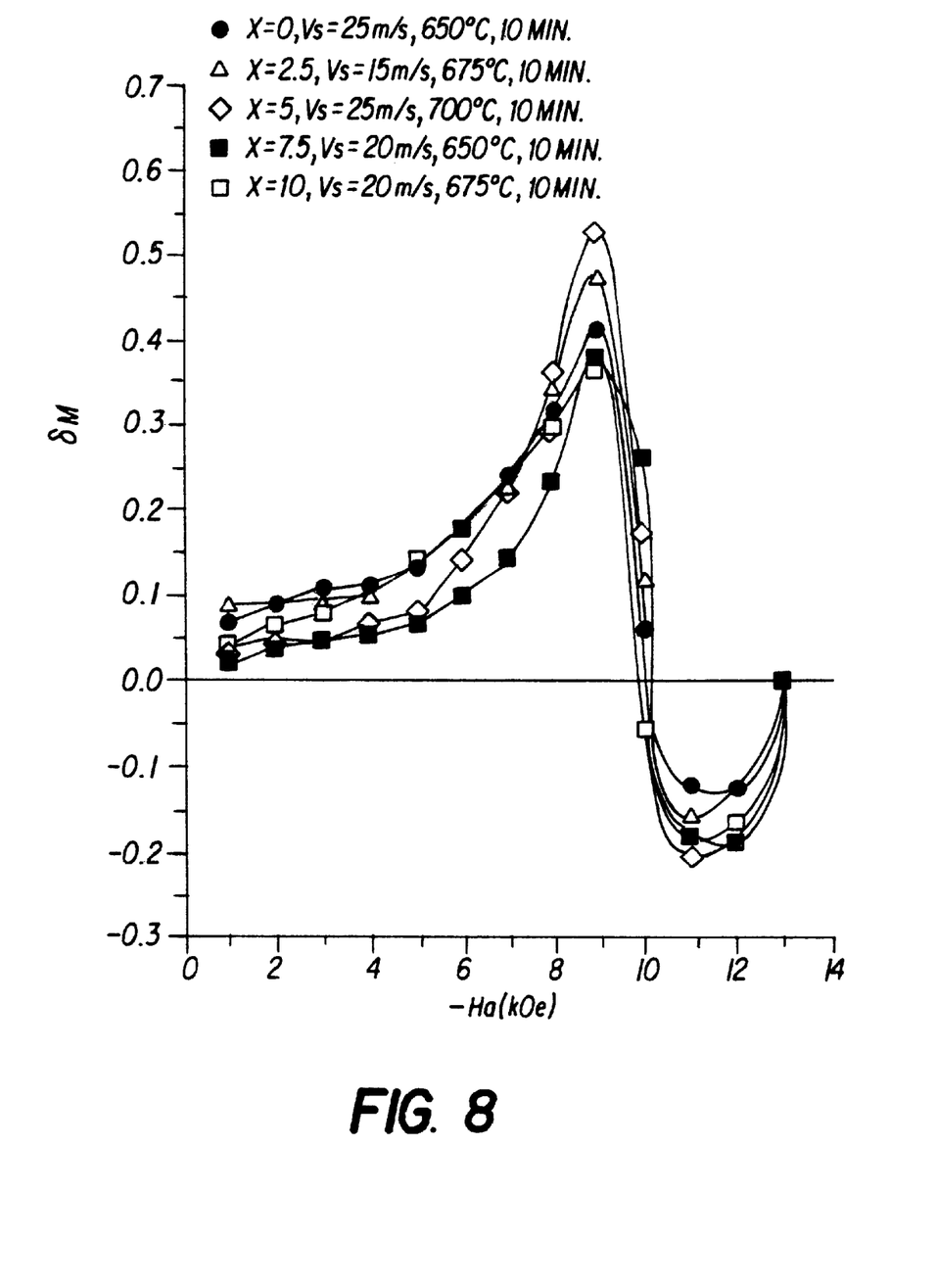
FIG. 8: The variation of $\delta M$ with the externally applied magnetic field for alloy ribbons of $(Nd_{0.95}La_{0.05})_{9.5}Fe_{78-x}Co_xCr_2B_{10.5}$ (x=0–10).

Shown in FIG. 8 are plots of $\delta M$ ($=m_d(H)-(1-2m_r(H))$), where $m_d$ is the reduced magnetization and mr is the reduced remanence [8,9], with respect to the applied magnetic field of the $(Nd_{0.95}La_{0.05})_{9.5}Fe_{78-x}Co_xCr_2B_{10.5}$ (x=0, 2.5, 5, 7.5 and 10) ribbons of five compositions studied.. The positive $\delta M$ peak height in these plots indicates the existence of exchange-coupling interaction between magnetically hard and soft phases. Combining the high $B_r$ found in x=7.5 and 10, the grain coarsening phenomenon and change in microstructure, one may conclude that the increase in $B_r$ and $(BH)_{max}$ of these two samples may arise from the increase in the saturation magnetization of both α-(Fe,Co) and 2:14:1 phases because of the Co substitution. Furthermore, this may also suggest that one needs to compromise the exchange coupling interaction, which is enhanced by fine average grains, with the grain coarsening and changes in the microstructure to achieve the highest $B_r$ and $(BH)_{max}$ on high Co concentration materials (5<x<10). As previously mentioned, Co substitution for Fe increases the $T_c$ of the 2:14:1 phase which may also be attractive for high operational temperature applications.

Shown in Table III are the variation of the $_iH_c$, irreversible loss of induction and reversible temperature coefficients of induction, α, with Co concentration of the materials studied. For x=0, the irreversible loss and α are −3.5% and −0.184 %/° C.; respectively. Co-substitution for Fe reduces α: from −0.184 %/° C. to −0.105 %/° C. when x was varied from 0 to 10. The decrease in the magnitude of α may be directly related to the increase of $T_c$ as observed in sintered Nd(Fe, Co)B magnets [10]. However, the irreversible loss seems to vary from −2.7 to 3.5% without a correlation to the Co-content within the compositions. For x=10, an irreversible loss of −3.4% and an α of −0.105%/° C. are obtained. These values are comparable to commercially available NdFeB powders (an irreversible loss of −4.5% and α of −0.105%/° C.) for the bonded magnet application.

Only two magnetic phases, i.e., α-Fe and $R_2Fe_{14}B$, are present in the optimally treated magnetic materials of the present invention, including the preferred $(Nd_{0.95}La_{0.05})_{9.5}Fe_{78-x}Co_xCr_2B_{10.5}$ (x=0–10) ribbons. Co-substitution for Fe, i.e. (for example the preferred range of x=2.5 through 10), increases the Curie temperature ($T_c$) of both α-(Fe,Co) and $R_2(Fe,Co)_{14}B$ phases. The $B_r$ and $(BH)_{max}$ are also increased in samples with high Co-content. Exchange-coupling between the magnetically hard and soft phases can be observed. Grain coarsening is found in optimally processed ribbons with a dilute Co substitution (x=2.5 and 5) by TEM analysis. The grain coarsening becomes less apparent when x is increased to 6 or higher. At x=10 for example, a smudged grain boundary phase (not identified) surrounding the main phases is observed. A $B_r$ of 10.4 kG, $_iH_c$ of 9.5 kOe and $(BH)_{max}$ of 19.8 MGOe are obtained on preferred compositions such as of the formula: $(Nd_{0.95}La_{0.05})_{9.5}Fe_{68}Co_{10}Cr_2B_{10.5}$. Moreover, the magnitude of the reversible temperature coefficient of induction of fully processed materials are found to decrease with increasing Co-content.

In summary, the phase transformations and magnetic properties of melt spun nanocomposites, e.g., $(Nd_{0.95}La_{0.05})_{9.5}Fe_{78-x}Co_xCr_2B_{10.5}$ (x=0–10), demonstrate two magnetic phases, i.e. α-(Fe,Co) and $R_2(Fe,Co)_{14}B$. Co substitution for Fe, e.g. x=2.5 through 10, increases the Curie temperature ($T_c$) of both the α-(Fe,Co) and $R_2(Fe,Co)_{14}B$ phases at a rate of approximately 20° C. per % of Co substitution. Minor grain coarsening can be observed on optimally processed ribbons containing low Co-content (e.g., x=5). Further increases in Co-content have no effect on the average grain size obtained. Instead, an unknown grain boundary phase surrounds the main phase on ribbons with x=10 for example. This change in microstructure may be one reason that the $_iH_c$ is preserved at more than 9.5 kOe with increasing Co-content. Exchange-coupling between the magnetically hard and soft phases is found in all samples. The remanence, $B_r$ and maximum energy product, $(BH)_{max}$, are improved drastically at x=7.5 and 10, which may arise from the increases in the saturation magnetization of α-(Fe, Co) and $R_2(Fe, Co)_{14}B$ as well as the exchange-coupling between them. A $B_r$ of 10.4 kG, $_iH_e$ of 9.5 kOe and $(BH)_{max}$ of 19.5 MGOF is achieved in $(Nd_{0.95}La_{0.05})_{9.5}Fe_{68}Co_{10}Cr_2B_{10.5}$. Moreover, the reversible temperature coefficient of induction (conventionally referred to as α) of optimally processed materials is found to decrease with increasing Co concentration.

REFERENCES

[1] A. Manaf, R. A. Buckley, H. A. Davies and M. Leonowicz, J. Magn. Magn. Mater., 101, 360 (1991).
[2] R. Coehoorn, D. B. de Mooji, J. P. W. B. Duchateau, and K. H. J. Buschow, J. Phys. 49, C8, 669 (1988).
[3] E. F. Kneller and R. Hawig, IEEE Trans. Magn., 27, 3588 (1991).
[4] A. Manaf, P. Z. Zhang, I. Ahmed, H. A. Davies and R. A. Buckley, IEEE Trans. Mag., 29 (1993) 2866.
[5] A. Manaf, M. Al-Khafaji, P. Z. Zhang, H. A. Davies, R. A. Buckley and W. Rainforth, J. Magn. Magn. Mater. 128 (1993) 307.
[6] W. C. Chang, D. M. Hsing, B. M. Ma and C. O. Bounds, IEEE Trans. Magn. 32 (1996), 4425.
[7] J. Bauer, M. Seeger, A. Zern, and H. Kronmuller, J. Appl. Phys. 80 (1996) 1667.
[8] F. Vajda and E. D. Torre, J. Appl. Phys. 75 (1994) 5689.
[9] P. E. Kelly, K. O'Grady, P. I. Mayo and R. W. Cantrell, IEEE Trans. Magn., MAG-25 (1989) 388.
[10] B. M. Ma, W. L. Liu, Y. L. Liang, D. W. Scoot, and C. O. Bounds, J. Appl. Phys., 75 (1994) 6628.

What is claimed is:

1. A permanent magnet material characterized by a chemical formula: $(RE_{1-y}La_y)_vFe_{100-v-w-x-z}Co_w M_z B_x$, wherein RE is at least one element selected from the group consisting of Pr and Nd;

M is Cr;

v is from about 9.5 to about 11.5 w is from about 5 to about 12 x is from about 9 to about 11.5 y is from about 0.05 to about 0.1 z is from about 2 to about 3 the magnet material having been made by rapid cooling from a molten state at a cooling rate between $10^4$ to $10^7$ degrees C./second to make a substantially amorphous material, followed by thermal treating at temperatures from about 600 to 750 degrees C. for 0.01 seconds to 120 minutes, the material containing the following phases:

(i) a hard magnetic phase comprising at least one member of the group consisting of $RE_2Fe_{14}B$ and $RE_2(Fe,Co)_{14}B$, (ii) a soft magnetic phase comprising at least one member of the group consisting of α-Fe, $Fe_3B$, and α-(Fe,Co), (iii) one or more metal M boride precipitated phases.

2. The magnet material of claim 1, wherein w is greater than or equal to 6.

3. The magnet material of claim 1, wherein RE is Nd.

4. The magnet material of claim 1, wherein w is from about 6 to about 12, and x is from about 10 to about 11.5.

5. The magnet material of claim 1, wherein w is from about 6 to about 12, x is from about 10 to about 11.5; and y is from about 0.05 to about 0.07.

6. The magnet material of claim 3, wherein

M is Cr;

w is from about 7 to about 12, x is from about 10.5 to about 11.5; y is from about 0.05 to about 0.07, and z is from about 2 to about 2.5.

7. The magnet material of claim 3, wherein x is about 9.5 to about 11.5.

8. The magnet material of claim 3, wherein x is about 10 to about 11.5.

9. The magnet material of claim 3, wherein x is about 10.5 to about 11.5.

10. The magnet material of claim 1, wherein x is from about 10.5 to about 11.5.

11. A bonded magnet comprising:
a permanent magnet material of claim 1, characterized by a chemical formula: $(RE_{1-y}La_y)_vFe_{100-v-w-x-z}Co_wM_zB_x$,
wherein
RE is at least one element selected from the group consisting of Pr and Nd;
M is Cr;
v is from about 9.5 to about 11.5
w is from about 5 to about 12
x is from about 9 to about 11.5
y is from about 0.05 to about 0.1
z is from about 2 to about 3; and
a binder;
the magnet material having been made by rapid cooling from a molten state at a cooling rate between $10^4$ to $10^7$ degrees C./second to make a substantially amorphous material, followed by thermal treating at temperatures from about 600 to 750 degrees C. for 0.01 seconds to 120 minutes,
the magnet material containing the following phases:
  (i) a hard magnetic phase comprising at least one member of the group consisting of $RE_2Fe_{14}B$ and $RE_2(Fe,Co)_{14}B$,
  (ii) a soft magnetic phase comprising at least one member of the group consisting of α-Fe, $Fe_3B$, and α-(Fe,Co),
  (iii) one or more metal M boride precipitated phases.

12. The bonded magnet of claim 10, wherein the binder comprises from about 0.5 to about 4 weight percent of the bonded magnet.

13. The magnet material of claim 1, wherein the magnitude of irreversible loss of induction is less than –4% when heated to 180° C. for about 15 minutes.

14. The magnet material of claim 1, wherein the $_iH_c$ is from 9.5 to 10.3 kOe.

15. The magnet material of claim 1, wherein the thermal treating occurs for about 8 to about 15 minutes at temperatures from about 645 to 750 degrees C.

16. The magnet material of claim 1, wherein the hard magnetic phase comprises $Nd_2Fe_{14}B$.

17. The magnet material of claim 8, wherein the hard magnetic phase comprises $RE_2(Fe,Co)_{14}B$ and the soft magnetic phase comprises α-(Fe,Co).

18. A permanent magnet material characterized by a chemical formula: $(RE_{1-y}La_y)_vFe_{100-v-w-x-z}Co_wM_zB_x$,
wherein
RE is at least one element selected from the group consisting of Pr and Nd;
M is at least one refractory metal selected from the group consisting of Ti and Cr;
v is from about 9.5 to about 11.5
w is from about 5 to about 12
x is from about 9 to about 11.5
y is from about 0.05 to about 0.1
z is from about 2.5 to about 3
the magnet material having been made by rapid cooling from a molten state at a cooling rate between $10^4$ to $10^7$ degrees C./second to make a substantially amorphous material, followed by thermal treating at temperatures from about 600 to 750 degrees C. for 0.01 seconds to 120 minutes,
the material containing the following phases:
  (i) a hard magnetic phase comprising at least one member of the group consisting of $RE_2Fe_{14}B$ and $RE_2(Fe,Co)_{14}B$,
  (ii) a soft magnetic phase comprising at least one member of the group consisting of α-Fe, $Fe_3B$, and α-(Fe,Co),
  (iii) one or more metal M boride precipitated phases.

19. The magnet material of claim 18, wherein
w is from about 7 to about 12, x is from about 10.5 to about 11.5; y is from about 0.05 to about 0.07, and z is from about 2 to about 2.5.

20. A method of making a bonded magnet of claim 11 comprising:
providing a powdered permanent magnet material characterized by a the chemical formula: $(RE_{1-y}La_y)_vFe_{100-v-w-x-z}Co_wM_zB_x$,
wherein
RE is at least one element selected from the group consisting of Pr and Nd;
M is Cr;
v is from about 9.5 to about 11.5
w is from about 5 to about 12
x is from about 9 to about 11.5
y is from about 0.05 to about 0.1
z is from about 2 to about 3;
the magnet material having been made by rapid cooling from a molten state at a cooling rate between $10^4$ to $10^7$ degrees C./second to make a substantially amorphous material, followed by thermal treating at temperatures from about 600 to 750 degrees C. for 0.01 seconds to 120 minutes, the magnet material containing the following phases:
  (i) a hard magnetic phase comprising at least one member of the group consisting of $RE_2Fe_{14}B$ and $RE_2(Fe,Co)_{14}B$,
  (ii) a soft magnetic phase comprising at least one member of the group consisting of α-Fe, $Fe_3B$, and α-(Fe,Co),
  (iii) one or more metal M boride precipitated phases;
and mixing the powdered permanent magnet material with a binder; and curing the binder to form the bonded magnet.

21. A method of making the magnet material of claim 1, comprising rapid cooling a composition of the chemical formula: $(RE_{1-y}La_y)_vFe_{100-v-w-x-z}Co_wM_zB_x$ as defined in claim 1, from a molten state at a cooling rate between $10^4$ to $10^7$ degrees C./second to make a substantially amorphous material, followed by thermal treating at temperatures from about 600 to 750 degrees C. for 0.01 seconds to 120 minutes.

22. The method of claim 21, wherein the cooling rate is between $10^5$ to $10^6$ degrees C./second and the thermal treating occurs at temperatures from about 600 to 700 degrees C. for 0.01 seconds to 15 minutes.

23. The method of claim 21, wherein the cooling rate is between $10^5$ to $10^6$ degrees C./second and the thermal treating occurs at temperatures from about 645 to 750 degrees C. for about 8 to about 15 minutes.

24. The method of claim 21, wherein the cooling rate is between $10^5$ to $10^6$ degrees C./second and the thermal treating occurs at temperatures from about 645 to 700 degrees C. for 0.01 seconds to 15 minutes.

25. The method of claim 21, wherein the cooling rate is between $10^5$ to $10^6$ degrees C./second and the thermal treating occurs at temperatures from about 645 to 655 degrees C. for 8 to 11 minutes.

* * * * *